United States Patent
Kim et al.

(10) Patent No.: US 11,436,868 B2
(45) Date of Patent: Sep. 6, 2022

(54) SYSTEM AND METHOD FOR AUTOMATIC RECOGNITION OF USER MOTION

(71) Applicant: ELECTRONICS AND TELECOMMUNICATIONS RESEARCH INSTITUTE, Daejeon (KR)

(72) Inventors: Jong Sung Kim, Daejeon (KR); Seung Joon Kwon, Seoul (KR); Sang Woo Seo, Daejeon (KR); Yeong Jae Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/104,949

(22) Filed: Nov. 25, 2020

(65) Prior Publication Data
US 2021/0192195 A1 Jun. 24, 2021

(30) Foreign Application Priority Data
Dec. 19, 2019 (KR) .......................... 10-2019-0171295

(51) Int. Cl.
*G06K 9/00* (2022.01)
*G06V 40/20* (2022.01)
(Continued)

(52) U.S. Cl.
CPC ............... *G06V 40/20* (2022.01); *G06T 7/20* (2013.01); *G06T 7/73* (2017.01);
(Continued)

(58) Field of Classification Search
CPC ........ G06V 40/20; G06V 20/20; G06V 40/23; G06V 2201/12; G06T 7/20; G06T 7/07;
(Continued)

(56) References Cited

U.S. PATENT DOCUMENTS 8,213,680 B2   7/2012  Fitzgibbon et al.
8,582,867 B2  11/2013  Litvak
(Continued)

FOREIGN PATENT DOCUMENTS

KR   20150028629 A   3/2015
KR   20170077444 A   7/2017
KR   20180008221 A   1/2018

OTHER PUBLICATIONS

Jong-Sung Kim et al., "Human Pose Machine with a ToF Sensor using Pre-trained Convolutional Neural Networks," ICTC 2019 The 10-th International Conference on Information and Communication Technology Convergence, Oct. 16-18, 2019, pp. 1-3.

*Primary Examiner* — Tom Y Lu

(57) ABSTRACT

Provided is a system and method for automatically recognizing user motion. The system for automatically recognizing user motion includes an input unit configured to receive three-dimensional (3D) measurement data, a memory which stores a program for performing automatic recognition on 3D user motion using 3D low-quality depth data and a deep learning model, and a processor configured to execute the program, wherein the processor converts the 3D low-quality depth data into 3D high-quality image data.

11 Claims, 7 Drawing Sheets

(51) Int. Cl.
    *G06T 7/20* (2017.01)
    *G06T 7/73* (2017.01)
(52) U.S. Cl.
    CPC ............. *G06T 2207/10028* (2013.01); *G06T 2207/20081* (2013.01); *G06T 2207/30196* (2013.01)
(58) Field of Classification Search
    CPC . G06T 2207/10028; G06T 2207/20081; G06T 2207/30196; G06T 2207/10024; G06T 2207/20016; G06T 2207/20084; G06T 7/24; G06T 3/4076; G06K 9/627; G06N 20/00
    See application file for complete search history.

(56) References Cited

U.S. PATENT DOCUMENTS

| | | | |
|---|---|---|---|
| 2007/0165949 A1* | 7/2007 | Sinop | G06T 7/194 |
| | | | 382/173 |
| 2008/0285807 A1 | 11/2008 | Lee et al. | |
| 2009/0232353 A1* | 9/2009 | Sundaresan | G06K 9/00342 |
| | | | 382/103 |
| 2015/0146928 A1* | 5/2015 | Kim | G06T 7/251 |
| | | | 382/103 |
| 2016/0232683 A1 | 8/2016 | Kim et al. | |
| 2018/0018786 A1 | 1/2018 | Jakubiak et al. | |
| 2021/0074003 A1* | 3/2021 | Xie | G06K 9/6206 |

\* cited by examiner

SYSTEM AND METHOD FOR AUTOMATIC RECOGNITION OF USER MOTION

CROSS-REFERENCE TO RELATED APPLICATION

This application claims priority to and the benefit of Korean Patent Application No. 2019-0171295, filed on Dec. 19, 2019, the disclosure of which is incorporated herein by reference in its entirety.

BACKGROUND

1. Field of the Invention

The present invention relates to a system and method for automatically recognizing user motion.

2. Discussion of Related Art

Conventional three-dimensional (3D) user motion recognition is performed according to a multi-high-speed camera method and a multi-motion sensor method. However, the multi-high-speed camera method requires use of expensive high-speed cameras, and synchronization and correction work between high-speed cameras and complex calculation processing.

In addition, the multi-motion sensor method requires expensive motion sensors to be attached to each joint area of the body, and requires synchronization and correction work between motion sensors, and complex calculation processing for converting measured relative 3D motion data into absolute 3D motion data.

SUMMARY OF THE INVENTION

The present invention is directed to solving the existing problems by providing a system and method capable of performing precise automatic recognition of 3D user motion through a low-cost depth sensor and a deep learning model instead of using expensive analysis devices, such as multiple high-speed cameras or multiple motion sensors.

The technical objectives of the present invention are not limited to the above, and other objectives may become apparent to those of ordinary skill in the art on the basis of the following description.

According to an aspect of the present invention, there is provided a system for automatically recognizing user motion, the system including: an input unit configured to receive three-dimensional (3D) measurement data; a memory which stores a program for performing automatic recognition on 3D user motion using 3D low-quality depth data and a deep learning model; and a processor configured to execute the program, wherein the processor converts the 3D low-quality depth data into 3D high-quality image data.

According to another aspect of the present invention, there is provided a method of automatically recognizing user motion, the method comprising the steps of: (a) learning a two-dimensional (2D) user motion to generate a deep learning model; and (b) performing automatic recognition on three-dimensional (3D) user motion using 3D low-quality depth data and the deep learning model.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
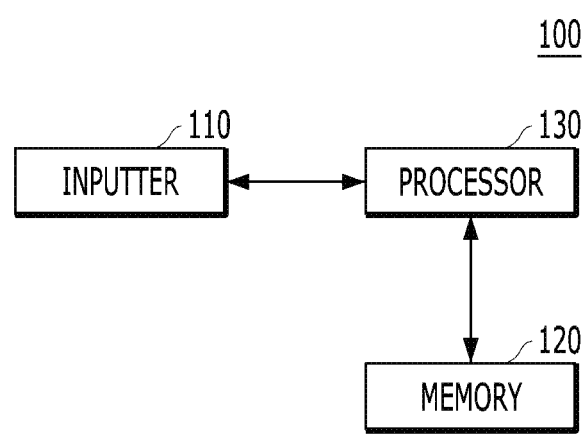
FIG. 1 illustrates a system for automatically recognizing user motion according to an embodiment of the present invention.

Hereinafter, the above and other objectives, advantages, and features of the present invention and ways of achieving them will become readily apparent with reference to descriptions of the following detailed embodiments in conjunction with the accompanying drawings However, the present invention is not limited to such embodiments and may be embodied in various forms. The embodiments to be described below are provided only to assist those skilled in the art in fully understanding the objectives, configurations, and the effects of the invention, and the scope of the present invention is defined only by the appended claims.

Meanwhile, terms used herein are used to aid in the explanation and understanding of the embodiments and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Before describing embodiments of the present invention, the background for proposing the present invention will be described first for the sake of understanding of those skilled in the art.

3D user motion recognition is required in technical fields, including motion recognition of a user's walking, touch, and grip in a virtual space in the field of virtual reality implemented by a computer, interactions between a user and a virtual object in an augmented space in the field of augmented reality; motion recognition for patient health checks or rehabilitation treatment in the field of healthcare, user motion recognition for automatic detection of abnormal behavior of visitors in the field of security, and interactions between a user and a virtual object for virtual reality- and augmented reality-based safety education in the field of safety.

In these technical fields, a computer is required to precisely and automatically recognize 3D user motion in a 3D virtual space or real space for user-computer interactions.

According to conventional technology, a multi-high-speed camera method and a multi-motion sensor method are proposed to recognize user motion in a 3D space.

In the multi-high-speed camera method, a reflective marker is attached to each joint area of the body, image data of the user with the attached marker is acquired through two or more high-speed cameras, 2D position data of the marker is detected and tracked in each image acquired by the multi-high speed cameras, and 3D position data of the marker is reconstructed from the 2D position data detected and tracked in each image, so that 3D user motion is recognized In the multi-motion sensor method, a motion sensor is attached to each joint area of the body and relative 3D motion data of the user is acquired, and the acquired relative 3D motion data is converted into absolute 3D motion data on the basis of an arbitrary origin in a 3D space, so that 3D user motion is recognized.

However, the conventional multi high-speed camera method requires the use of multiple expensive high-speed cameras, and requires synchronization and correction between the multiple high-speed cameras, and complex calculation processing, such as detection of 2D position data of reflective markers attached to the body, tracking of 2D position data, and reconstruction of 3D position data.

In addition, the conventional multi-motion sensor method requires expensive motion sensors to be attached to each joint area of the body, and requires synchronization and correction between the motion sensors, and complex calculating processing, such as converting measured relative 3D motion data into absolute 3D motion data.

The present invention is proposed to obviate the above-described limitations, and provides a system and method capable of performing highly-precise automatic recognition of 3D user motion required for user-computer interactions, through low-cost depth sensors and a deep learning model instead of using expensive analysis devices, such as multiple high-speed cameras or multiple motion sensors, and complex calculation processing in the fields of virtual reality, augmented reality, healthcare, security, and safety.

According to an embodiment of the present invention, 3D low-quality depth data acquired from a low-cost depth sensor is converted into 3D high-quality image data, and then a deep learning model pre-trained with 2D large-capacity image data is applied to the 3D high-quality image data, so that precise automatic recognition of 3D user motion is achieved without performing complex calculations.

According to an embodiment of the present invention, for user motion recognition, 3D low-quality depth data including a large number of errors is acquired through a low-cost depth sensor.

In order to precisely perform 3D user motion recognition using the 3D low-quality depth data, the 3D low-quality depth data is converted into 3D high-quality image data through data conversion.

A deep learning model pre-trained with 2D large-capacity image data is applied to a 2D image domain of the 3D high-quality image data, so that precise 3D user motion recognition is finally performed.

FIG. 1 illustrates a system for automatically recognizing user motion according to an embodiment of the present invention.

The system for automatically recognizing user motion according to the present invention is characterized as including an input unit 110 configured to receive three-dimensional (3D) measurement data, a memory 120 which stores a program for performing automatic recognition on 3D user motion using 3D low-quality depth data and a deep learning model, and a processor 130 configured to execute the program, wherein the processor 130 converts the 3D low-quality depth data into 3D high-quality image data.

The processor 130 defines the deep learning model using 2D image data acquired by a camera and 2D user motion data.

The processor 130 converts the 3D measurement data received by the input unit into the 3D low-quality depth data on the basis of a maximum measurable depth value.

The processor 130, in order to convert the 3D low-quality depth data of the current time into the 3D high-quality image data of the current time, synthesizes the 3D low-quality depth data acquired at the current time with 3D high-quality intermediate data generated at an immediately previous time to form 3D high-quality intermediate data required to generate the 3D high-quality image data of the current time.

The processor 130 applies the deep learning model to a 2D image domain of the 3D high-quality image data to perform motion recognition.

The processor 130 recognizes a position of a skeletal joint on the 2D image domain of the 3D high-quality image data.

The processor 130 recognizes a 2D position of the skeletal joint, and calculates a 3D position of the skeletal joint using, a depth value corresponding to the 2D position and a focal length of a lens.

Figure 2:
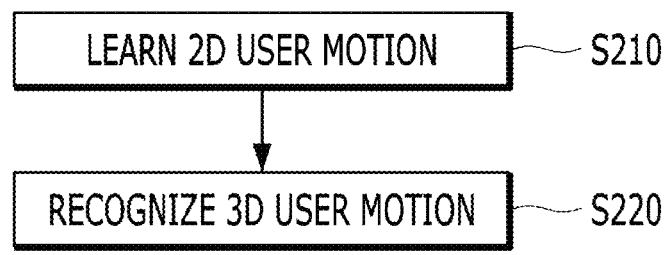
FIG. 2 illustrates a method of automatically recognizing, user motion according to an embodiment of the present invention.

FIG. 2 illustrates a method of automatically recognizing user motion according to an embodiment of the present invention.

The method of automatically recognizing user motion according to the present. invention is characterized as including learning two-dimensional (2D) user motion to generate a deep learning model (S210) and performing automatic recognition on three-dimensional (3D) user motion using 3D low-quality depth data and the deep learning model (S220).

In operation S210, the deep learning model is generated using 2D image data acquired by a camera and 2D user motion data.

In operation S220, 3D measurement data is converted into the 3D low-quality depth data on the basis of a maximum measurable depth value.

In operation S220, the 3D low-quality depth data acquired at the current time is synthesized with 3D high-quality intermediate data generated at an immediately previous time to form 3D high-quality intermediate data required to generate 3D high-quality image data of the current time.

In operation S220, the deep learning model is applied to a 2D image domain of the 3D high-quality image data to perform motion recognition.

In operation S220, a 2D position of a skeletal joint is recognized, and a 3D position of the skeletal joint is calculated using a depth value corresponding to the 2D position and a focal length of a lens.

Figure 3:
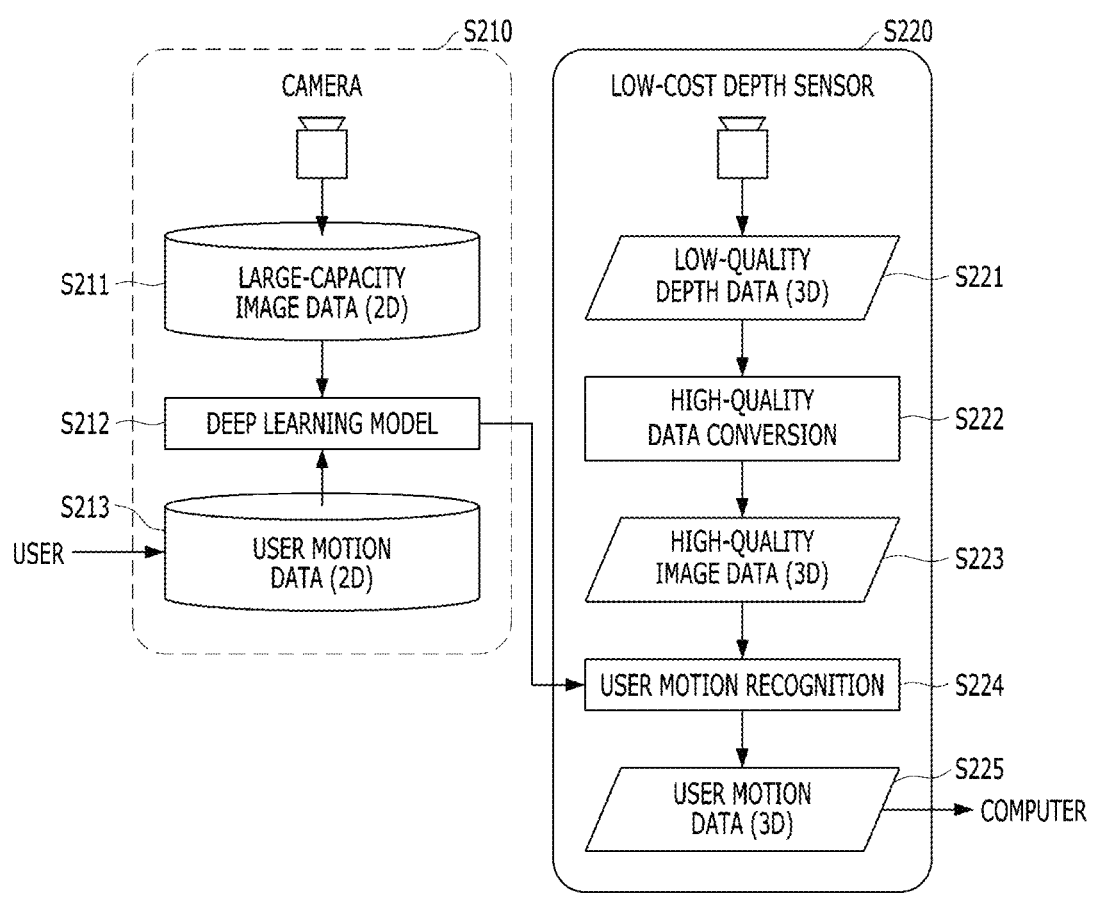
FIG. 3 illustrates a two-dimensional (2D) user motion learning process and a third-dimensional (3D) user motion recognition process according to an embodiment of the present invention.
Figure 4:
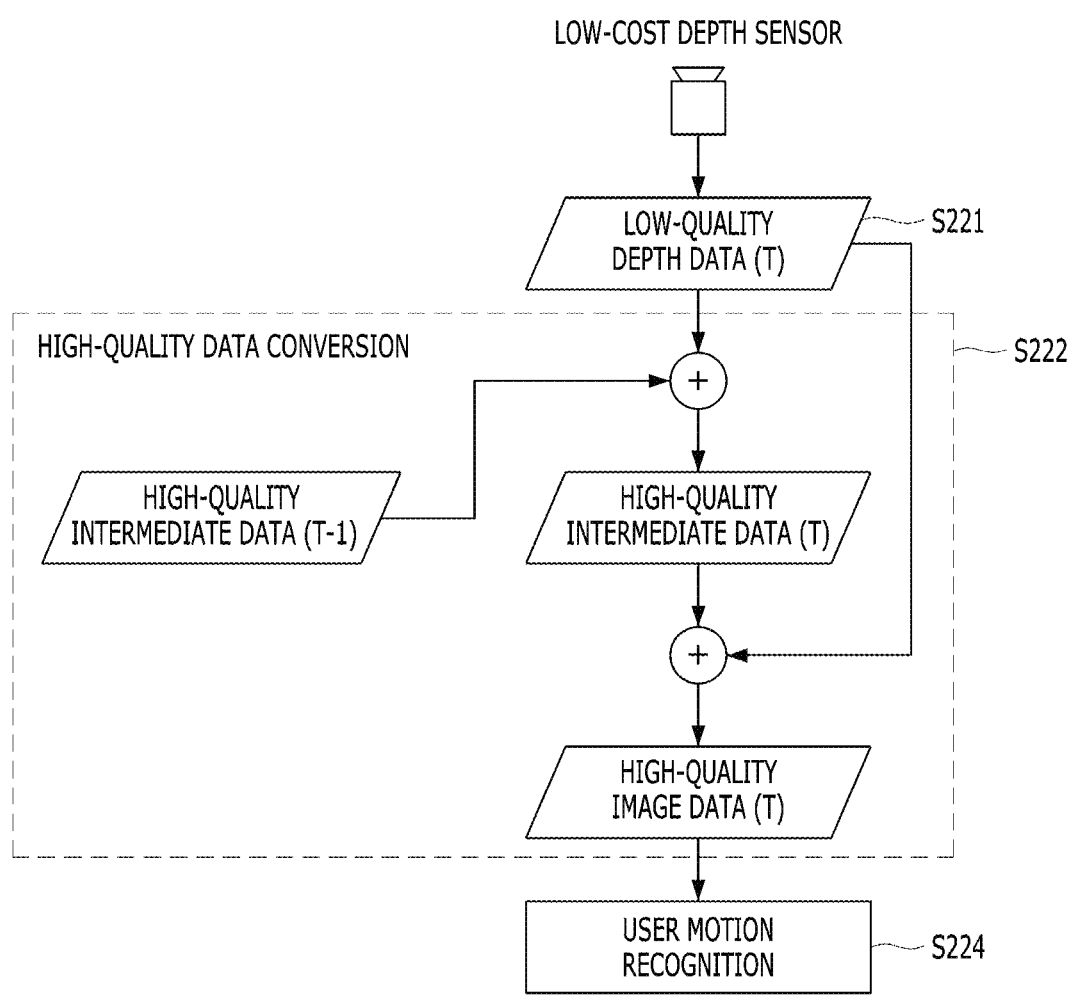
FIG. 4 illustrates a high-quality data conversion process according to an embodiment of the present invention.

FIG. 3 illustrates a two-dimensional (2D) user motion leaning, process and a third-dimensional (3D) user motion recognition process according to an embodiment of the present invention, and FIG. 4 illustrates a high-quality data conversion process according to an embodiment of the present invention.

In FIG. 3, a 2D user motion learning process S210 and a 3D user motion recognition process S220 are illustrated.

According to the embodiment of the present invention, without using the conventional method of training a model for 3D user motion recognition from 3D low-quality depth data acquired by a low-cost depth sensor, a deep learning model is generated using 2D large-capacity image data acquired by a camera (S211) and 2D user motion data generated by an operator (S213).

In operation S212, a deep learning model pre-trained through deep learning techniques, such as a deep neural network (DNN), a convolutional neural network (CNN) or a recurrent neural network (RNN), or a previously published deep learning model is used.

When 2D image data having a value between 0 and 255 acquired by a camera in advance for user motion recognition is represented as $G_2$, and the position of an arbitrary 2D pixel on the 2D image data is x=(x, y), a deep learning model pre-trained through 2D large-capacity image data acquired by a camera and 2D user motion data input by an operator is defined as Equation 1.

$$\hat{l} = \max_{l \in L} P_l(G_2, x, w_l) \quad [\text{Equation 1}]$$

Here, $P_l(G_2, x, w_l)$ is a function expressing the possibility or confidence that the position x of a 2D pixel on input 2D image data $G_2$ corresponds to a label l on the basis of a neural network model.

$w_l$ refers to internal parameters of a function $P_l$ that vary depending on a neural network model trained with 2D large-capacity image data acquired by a camera and 2D user motion data input by an operator.

Label l is a user joint label belonging to a set L of joint labels of a user skeleton.

As shown in Equation 2, the set L of user joint labels includes fifteen or more joint labels constituting a user's skeleton and a null label indicating a non-joint.

$$L = \begin{Bmatrix} \text{HEAD} \\ \text{NECK} \\ \text{SHOULDER\_CENTER} \\ \text{RIGHT\_SHOULDER} \\ \text{RIGHT\_ELBOW} \\ \text{RIGHT\_WRIST} \\ \text{LEFT\_SHOULDER} \\ \text{LEFT\_ELBOW} \\ \text{LEFT\_WRIST} \\ \text{HIP\_CENTER} \\ \text{RIGHT\_HIP} \\ \text{RIGHT\_KNEE} \\ \text{RIGHT\_ANKLE} \\ \text{LEFT\_HIP} \\ \text{LEFT\_KNEE} \\ \text{LEFT\_ANKLE} \\ \text{NULL} \end{Bmatrix} \quad [\text{Equation 2}]$$

3D low-quality measurement data $D_3^t$ acquired using a low-cost depth sensor, such as a time-of-flight (ToF) sensor, at the current time t and having a maximum depth value of $d_{max}$ is converted into 3D low-quality depth data $E_3^t$ having a value between 0 and 255 as shown in Equation 3.

$$E_3^t(x) = \begin{cases} \text{if } D_3^t(x) \leq 0 \\ 255 \times \dfrac{D_3^t(x)}{d_{max}} \\ \text{else} \\ 0 \end{cases} \quad [\text{Equation 3}]$$

In this case, since the maximum depth value $d_{max}$ is a fixed value for each used low-cost depth sensor, inverse transformation from the 3D low-quality depth data $E_3^t$ back to the 3D low-quality measurement data $D_3^t$ may be performed at any time.

The 3D low-quality depth data $E_3^t$ acquired through the low-cost depth sensor may have depth distortion, an amplitude-related error, a temperature-related error, light scattering, motion blurring, and other various errors due to various causes, and thus may have a large number of pixels with no values.

In order to solve this problem, according to the embodiment of the present invention, high-quality data conversion processing is performed.

Referring to FIG. 4, in the high-quality data conversion processing according to the embodiment of the present invention, in order to convert the 3D low-quality depth data $E_3^t$ into 3D high-quality image data $G_3^t$, the 3D low-quality depth data $E_3^t$ acquired at the current time t is synthesized with 3D high-quality intermediate data $F_3^{t-1}$ generated at a previous time t−1 to form 3D high-quality intermediate data $F_3^t$ as shown in Equation 4.

$$F_3^t(x) = \begin{cases} \text{if } F_3^{t-1}(x) = 0 \\ \max(0, F_3^{t-1}(x_{neighbor})) \\ \text{else if } F_3^{t-1}(x) > 0 \text{ and } |E_3^t(x) - F_3^{t-1}(x)| \leq \epsilon \\ \alpha E_3^t(x) + (1 - \alpha) F_3^{t-1}(x) \\ \text{else} \\ F_3^{t-1}(x) \end{cases} \quad [\text{Equation 4}]$$

Here, the 2D pixel position $x_{neighbor}$ represents the position of a neighboring pixel adjacent to x, and ∈ is a value representing an error level corresponding to Gaussian noise of the low-cost depth sensor present in the 3D low-quality depth data $E_3^t$.

The 3D high-quality intermediate data $F_3^t$ generated as described above is has a characteristic of being more robust to sensor errors over time, and thus pixels with no values gradually disappear.

The 3D low-quality depth data $E_3^t$ acquired by the low-cost depth sensor at the current time t is synthesized with the 3D high-quality intermediate data $F_3^t$ generated by the above method as shown in Equation 5 to form 3D high-quality image data $G_3^t$ at the current time t required for 3D user motion recognition through the deep learning model.

$$G_3^t(x) = \begin{cases} \text{if } E_3^t(x) = 0 \\ \max(0, E_3^t(x_{neighbor})) \\ \text{else if } E_3^t(x) > 0 \text{ and } |E_3^t(x) - F_3^t(x)| \le \epsilon \\ F_3^t(x) \\ \text{else} \\ E_3^t(x) \end{cases} \quad \text{[Equation 5]}$$

The 3D low-quality depth data $E_3^t$ acquired at the current time t from the low-cost depth sensor is converted into the 3D high-quality image data $G_3^t$.

Figure 5:
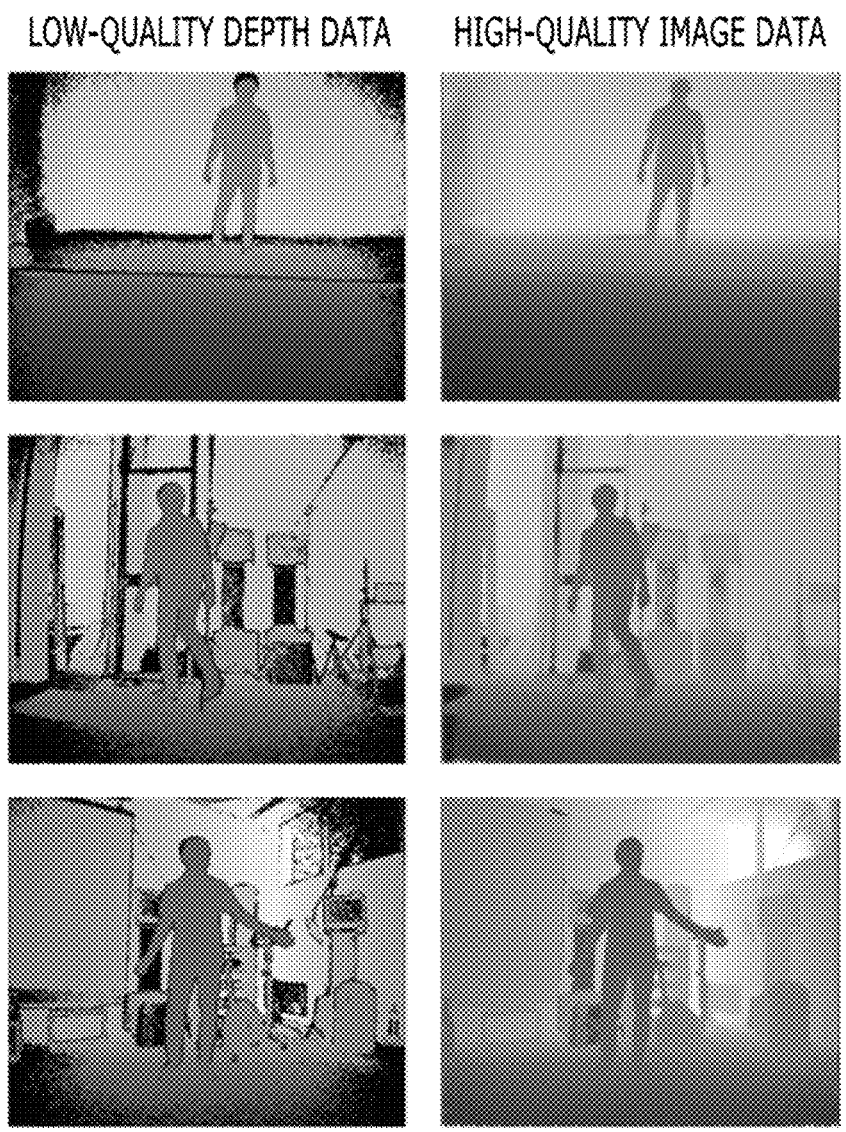
FIG. 5 illustrates a result of high-quality image data conversion according to an embodiment of the present invention.

FIG. 5 illustrates a result of the high-quality image data conversion according to the embodiment of the present invention.

Referring to FIG. 5, examples of 3D low-quality depth data $E_3^t$ acquired through a low-cost depth sensor and 3D high-quality image data $G_3^t$ generated through high-quality data conversion processing are shown.

Referring to FIG. 5, it can be seen that in the 3D high-quality image data $G_3^t$, a large number of errors and pixels with no measurement values seen on the 3D low-quality depth data $E_3^t$ are effectively removed through high-quality data conversion according to the embodiment of the present invention.

The pre-trained deep learning model is equally applied to a 2D image domain $G_{3(2)}^t$ of the converted 3D high-quality image data $G_3^t$ as shown in Equation 6.

$$\hat{l} = \max_{l \in L} P_l(G_{3(2)}^t, x, w_l) \quad \text{[Equation 6]}$$

Figure 6:
FIG. 6 illustrates skeletal joint recognition resulting from employing a deep learning model according to an embodiment of the present invention.

FIG. 6 illustrates skeletal joint recognition resulting from employing a deep learning model according to an embodiment of the present invention.

Referring to FIG. 6, by applying the pre-trained deep learning model to the 2D image domain $G_{3(2)}^t$ of the 3D high-quality image data $G_3^t$, it can be seen that fifteen skeletal joints (HEAD, NECK, SHOULDER_CENTER, RIGHT_SHOULDER, RIGHT_ELBOW, RIGHT_WRIST, LEFT_SHOULDER, LEFT_ELBOW, LEFT_WRIST, HIP_CENTER, RIGHT_HIP, RIGHT_KNEE, RIGHT_ANKLE, LEFT_HIP, LEFT_KNEE, LEFT_ANKLE) are all precisely recognized.

Finally, when the 2D position of a label-l joint on the 2D image domain $G_{3(2)}^t$ of the 3D high-quality image data $G_3^t$ is $x_l=(x_l, y_l)$, the depth value corresponding to the 2D position is $d_l$, and the focal length of a lens used in the low-cost depth sensor is f, the 3D position $X_l=(X_l, Y_l, Z_l)$ of the label-I joint is calculated as in Equation 7.

$$X_l = \begin{pmatrix} X_l \\ Y_l \\ Z_l \end{pmatrix} = \begin{pmatrix} \frac{d_l}{f} \times x_l \\ \frac{d_l}{f} \times y_l \\ d_l \end{pmatrix} \quad \text{[Equation 7]}$$

As described above, according to the embodiment of the present invention, the deep learning model is applied to the 3D high-quality image data converted from the 3D low-quality depth data acquired by the low-cost depth sensor at the current time t so that automatic recognition of 3D user motion may be precisely performed.

Meanwhile, the method of automatically recognizing user motion according to the embodiment of the present invention may be implemented in a computer system or may be recorded on a recording medium. The computer system may include at least one processor, a memory, a user input device, a data communication bus, a user output device, and a storage. The above described components perform data communication through the data communication bus.

The computer system may further include a network interface coupled to a network. The processor may be a central processing unit (CPU) or a semiconductor device for processing instructions stored in the memory and/or storage.

The memory and the storage may include various forms of volatile or nonvolatile media. For example, the memory may include a read only memory (ROM) or a random-access memory (RAM).

Accordingly, the method of automatically recognizing user motion according to the embodiment of the present invention may be implemented in a computer-executable form. When the method of automatically recognizing user motion according to the embodiment of the present invention is performed by the computer, instructions readable by the computer may perform the method of automatically recognizing user motion according to the embodiment of the present invention.

Meanwhile, the method of automatically recognizing user motion according to the embodiment of the present invention may be embodied as computer readable code on a computer-readable recording medium. The computer-readable recording medium is any recording medium that can store data that can be read by a computer system. Examples of the computer-readable recording medium include a ROM, a RAM, a magnetic tape, a magnetic a disk, a flash memory, an optical data storage, and the like. In addition, the computer-readable recording medium may be distributed over network-connected computer systems so that computer readable code may be stored and executed in a distributed manner.

As is apparent from the above, precise automatic recognition of 3D user motion is performed through a low-cost depth sensor and a deep learning model without using expensive recognition devices, such as multiple high-speed cameras or multiple motion sensors, and the relevant complex calculation processing, thereby exhibiting high performance in utility and feasibility in terms of cost.

The effects of the present invention are not limited to those mentioned above, and other effects not mentioned above will be clearly understood by those skilled in the art from the above detailed description.

Although the present invention has been described with reference to the embodiments, a person of ordinary skill in the art should appreciate that various modifications, equivalents, and other embodiments are possible without departing from the scope and spirit of the present invention. Therefore, the embodiments disclosed above should be construed as being illustrative rather than limiting the present invention. The scope of the present invention is not defined by the above embodiments but by the appended claims of the present invention, and the present invention is to cover all modifications, equivalents, and alternatives falling within the spirit and scope of the present invention.

Figure 7:
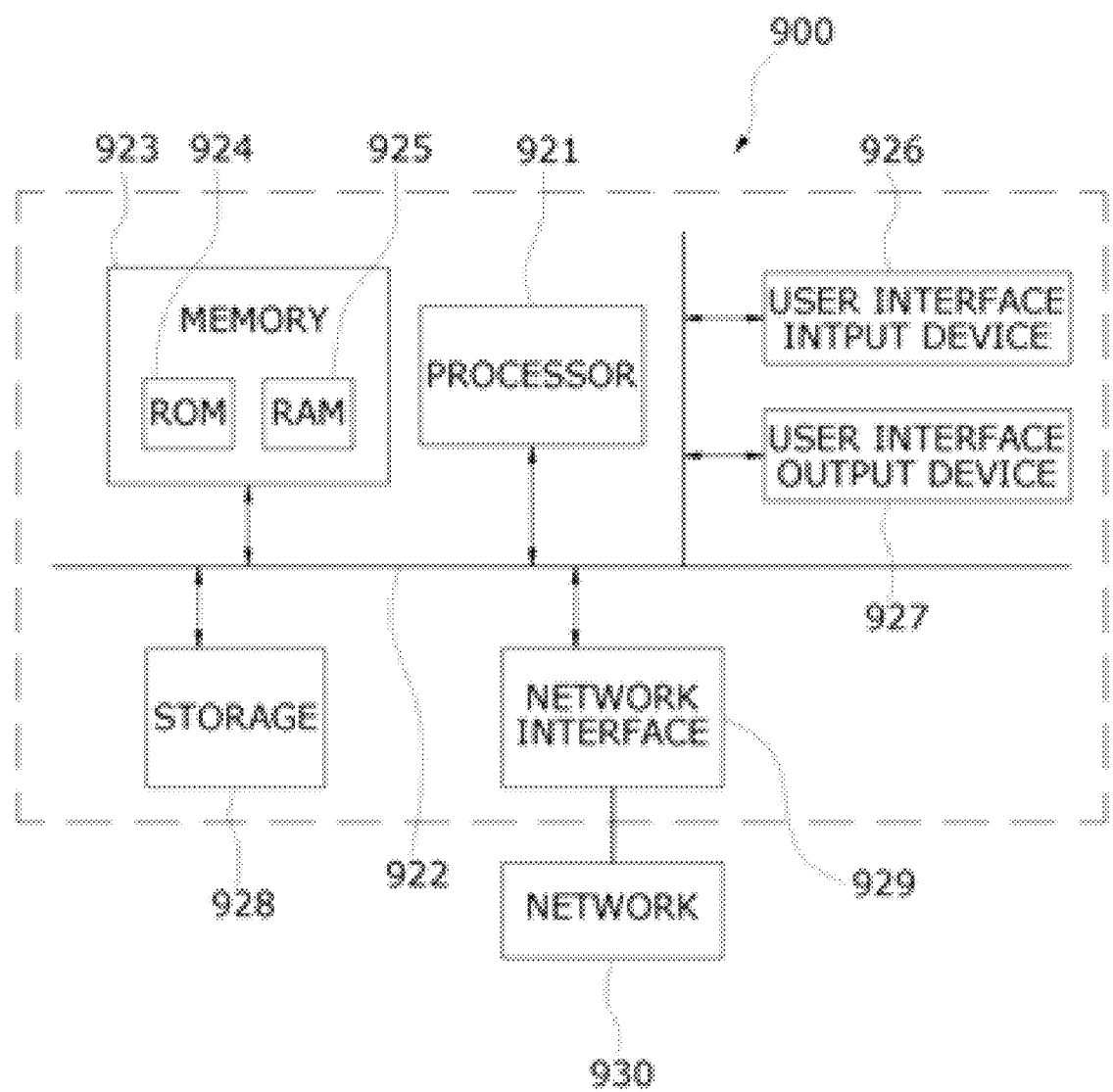
FIG. 7 is a view illustrating an example of a computer system in which a method according to an embodiment of the present invention is performed.

The method according to an embodiment of the present invention may be implemented in a computer system or may be recorded in a recording medium. FIG. 7 illustrates a simple embodiment of a computer system. As illustrated, the computer system may include one or more processors 921, a memory 923, a user input device 926, a data communication bus 922, a user output device 927, a storage 928, and the like. These components perform data communication through the data communication bus 922.

Also, the computer system may further include a network interface 929 coupled to a network. The processor 921 may be a central processing unit (CPU) or a semiconductor device that processes a command stored in the memory 923 and/or the storage 928.

The memory 923 and the storage 928 may include various types of volatile or non-volatile storage mediums. For example, the memory 923 may include a ROM 924 and a RAM 925.

Thus, the method according to an embodiment of the present invention may be implemented as a method that can be executable in the computer system. When the method according to an embodiment of the present invention is performed in the computer system, computer-readable commands may perform the producing method according to the present invention.

The method according to the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

The technical objectives of the present invention are not limited to the above, and other objectives may become apparent to those of ordinary skill in the art based on the specification.

Although the present invention has been described with reference to the embodiments, a person of ordinary skill in the art should appreciate that various modifications, equivalents, and other embodiments are possible without departing from the scope and spirit of the present invention. Therefore, the embodiments disclosed above should be construed as being illustrative rather than limiting the present invention. The scope of the present invention is not defined by the above embodiments but by the appended claims of the present invention, and the present invention is to cover all modifications, equivalents, and alternatives falling within the spirit and scope of the present invention.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in ally form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Further-more, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A system for automatically recognizing user motion, the system comprising:
    an input unit configured to receive three-dimensional (3D) measurement data that is acquired by a low-cost depth sensor;
    a memory which stores a program for performing automatic motion recognition on 3D user motion using 3D high-quality image data and a deep learning model; and
    a processor configured to execute the program,
    wherein the processor converts 3D low-quality depth data into the 3D high-quality image data, the 3D low-quality depth data being obtained from the 3D measurement data, and
    wherein the processor, in order to convert the 3D low-quality depth data of a current time into the 3D high-quality image data of the current time, synthesizes the 3D low-quality depth data of the current time with 3D high-quality intermediate data generated at an immediately previous time to form 3D high-quality intermediate data that is required to generate the 3D high-quality image data of the current time.

2. The system of claim 1, wherein the processor defines the deep learning model using 2D image data acquired by a camera and 2D user motion data.

3. The system of claim 1, wherein the processor converts the 3D measurement data received by the input unit into the 3D low-quality depth data using a maximum measurable depth value that is a fixed value for the low-cost depth sensor.

4. The system of claim 1, wherein the processor applies the deep learning model to a 2D image domain of the 3D high-quality image data to perform the automatic motion recognition.

5. The system of claim 1, wherein the processor recognizes a position of a skeletal joint on a 2D image domain of the 3D high-quality image data.

6. The system of claim 5, wherein the processor recognizes a 2D position of the skeletal joint, and calculates a 3D position of the skeletal joint using a depth value corresponding to the 2D position and a focal length of a lens.

7. A method of automatically recognizing a user motion, the method comprising the steps of:
    learning two-dimensional (2D) user motion to generate a deep learning model;
    receiving three-dimensional (3D) measurement data that is acquired by a low-cost depth sensor;
    generating 3D low-quality depth data based on the 3D measurement data;
    converting the 3D low-quality depth data into 3D high-quality image data; and
    performing automatic motion recognition on 3D user motion using the 3D high-quality image data and the deep learning model,
    wherein the converting includes synthesizing the 3D low-quality depth data acquired at a current time with 3D high-quality intermediate data generated at an immediately previous time to form 3D high-quality intermediate data that is required to generate the 3D high-quality image data of the current time.

8. The method of claim 7, wherein the learning includes generating the deep learning model using 2D image data acquired by a camera and 2D user motion data.

9. The method of claim 7, wherein the generating includes converting the 3D measurement data into the 3D low-quality depth data on a basis of a maximum measurable depth value that is a fixed value for the low-cost depth sensor.

10. The method of claim 7, wherein the performing includes applying the deep learning model to a 2D image domain of the 3D high-quality image data to perform the automatic motion recognition on the 3D user motion.

11. The method of claim 7, wherein the performing includes recognizing a 2D position of a skeletal joint, and calculating a 3D position of the skeletal joint using a depth value corresponding to the 2D position and a focal length of a lens.

* * * * *